United States Patent
Hegenbart et al.

(10) Patent No.: US 12,241,574 B2
(45) Date of Patent: Mar. 4, 2025

(54) CONNECTING SYSTEM FOR CONNECTING COMPONENTS IN AN AIRCRAFT

(71) Applicant: Airbus Operations GmbH, Hamburg (DE)

(72) Inventors: Matthias Hegenbart, Hamburg (DE); Pierre Zahlen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 202 days.

(21) Appl. No.: 17/902,164

(22) Filed: Sep. 2, 2022

(65) Prior Publication Data

US 2023/0100434 A1    Mar. 30, 2023

(30) Foreign Application Priority Data

Sep. 30, 2021   (EP) ..................................... 21200095

(51) Int. Cl.
*F16L 3/22*   (2006.01)
*F16B 1/00*   (2006.01)

(52) U.S. Cl.
CPC ................. *F16L 3/22* (2013.01); *F16B 1/00* (2013.01); *F16B 2200/83* (2023.08)

(58) Field of Classification Search
CPC .... F16L 3/22; F16B 1/00; F16B 39/10; F16B 2200/83
USPC ................................. 411/103, 109; 311/103
See application file for complete search history.

(56) References Cited

U.S. PATENT DOCUMENTS

| | | | | |
|---|---|---|---|---|
| 2,960,354 | A * | 11/1960 | Addie | F16L 51/035 285/228 |
| 11,125,365 | B2 * | 9/2021 | Chung | F16B 1/00 |
| 2017/0311666 | A1 * | 11/2017 | Gladish | H01F 1/44 |
| 2023/0100434 | A1 * | 3/2023 | Hegenbart | F16L 51/02 411/103 |

FOREIGN PATENT DOCUMENTS

| | | |
|---|---|---|
| EP | 2058574 B1 | 4/2013 |
| EP | 2907929 B1 | 9/2017 |

OTHER PUBLICATIONS

European Search Report; priority document.

* cited by examiner

*Primary Examiner* — Roberta S Delisle
(74) *Attorney, Agent, or Firm* — Greer, Burns & Crain, Ltd.

(57) ABSTRACT

A connecting system for connecting components in a vehicle includes a first elongate element with a first connecting face at a first end, and a second elongate element with a second connecting face at a second end. The first and second elements each comprise holding devices distributed along an annular connecting line. The connecting faces are congruent. The connecting faces and holding devices are configured to be brought into a flush superficial contact when the orientations of the elongate elements coincide, and the mutually opposing holding devices then connect with one another. One of the elements has a length adjustment component configured to change a position of the respective connecting face in a longitudinal direction of the respective element. The connecting faces comprise at least one pair of connectable interfaces which correlate with one another in pairs for transfer of a fluid, electrical or optical signals or electrical current.

15 Claims, 3 Drawing Sheets

CONNECTING SYSTEM FOR CONNECTING COMPONENTS IN AN AIRCRAFT

CROSS-REFERENCES TO RELATED APPLICATIONS

This application claims the benefit of the European patent application No. 21200095.4 filed on Sep. 30, 2021, the entire disclosures of which are incorporated herein by way of reference.

FIELD OF THE INVENTION

The present invention concerns a connecting system for connecting components in an aircraft, a structural and equipment system, and a vehicle.

BACKGROUND OF THE INVENTION

During final assembly of an aircraft, structural elements and equipment components are usually handled and installed manually. For example, components which must be connected to an electrical network or fluid sources and fluid sinks by means of electrical lines or fluid lines, are arranged in underfloor regions. For this, the components must be correspondingly equipped with lines which must be connected to structurally fixed lines after installation of a corresponding assembly. This can be a complicated process because of the size of an aircraft and the complexity of the equipment.

SUMMARY OF THE INVENTION

It is an object of the invention to provide a system with which components in an aircraft can be connected together quickly or easily.

A connecting system is proposed for connecting components in a vehicle, comprising a first elongate element with a first connecting face at a first end, a second elongate element with a second connecting face at a second end, wherein the first element and the second element each comprise several holding devices which are distributed along an annular connecting line of the respective connecting face, wherein the connecting faces and the connecting lines of the first element and second element are congruent, wherein the connecting faces and holding devices are configured such that the connecting faces can be brought into a flush superficial contact when the orientations of the first elongate element and second elongate element coincide, and the then mutually opposite holding devices of the connecting faces brought into superficial contact connect with one another, wherein at least one of the first element and second element has a respective length adjustment component which adjoins the respective connecting face and is configured to change a position of the respective connecting face in a longitudinal direction of the respective element, and wherein the connecting faces comprise at least one pair of interfaces which correlate with one another in pairs for transfer of a fluid, electrical or optical signals, or an electrical current, which interfaces can be brought into connection when the connecting faces are brought into superficial contact with one another.

The connecting system according to the invention may be used for connecting a component, which is to be installed in a vehicle, to a medium line or similar arranged therein. The first elongate element may be structurally fixed or arranged on a component in the vehicle which is itself already structurally fixed. The second elongate element may be arranged on an equipment component, an assembly to be installed, or similar. When the assembly is arranged at the desired installation site, the first connecting face and the second connecting face may be brought into a superficial contact. The two elongate elements are thereby connected together.

The first elongate element and the second elongate element may comprise a medium line, for example a fluid line, an electrical line or similar. The elongate elements are not restricted to conducting only a single medium, but several medium lines may also be present as a bundle. The term "elongate" means that at least in the region of the connecting faces, an arrangement is provided with a largely constant cross-section which extends along an axis, i.e., the longitudinal axis. The respective elongate element ends at the respective connecting face which is arranged at the first and/or second end.

The connecting faces each have a connecting line which is arranged on the connecting face. The term "annular" means that the connecting line is formed circumferentially on the connecting face in a closed loop. It is a theoretical line on which several holding devices may be arranged. The number of holding devices may be dependent on their action principle or design. Holding devices working by form fit, force fit or substance bonding are conceivable. Latching elements may be provided which engage to form a form-fit latch connection. In contrast, magnetic holding devices create a force-fit connection. Solder and welding connections may be provided which can be produced by an additional effect from the outside, such as by selective application of a suitable electrical welding voltage.

The purpose of the connecting faces with the holding devices arranged thereon is to create a connection between the two elements as simply and quickly as possible without requiring direct manual intervention. An assembly or similar may comprise an arrangement of structural components with lines or electrical consumers arranged thereon which are to be installed structurally fixedly. Connecting lines or components could be very difficult to access after being installed structurally fixedly, in particular if the assembly is accessible only from a side facing away from the connecting lines and components. Later creation of a connection of individual lines would be difficult. By use of the connecting system according to the invention, however, the connecting lines can automatically connect to adjoining lines directly during the structurally fixed installation of the assembly.

In order to prevent the two elongate elements from being mechanically distorted when joined together, in particular in the case of larger structures, varying temperatures and associated thermal expansion effects, length adjustment components are provided. These allow a degree of variability of the position of the individual connecting faces, thereby preventing distortion and allowing improved connection.

A respective surface normal of the connecting faces may stand obliquely to an extent axis of the respective element. The connecting faces thereby form a chamfer of the elongate elements. The oblique attitude increases the surface area of the connecting faces in comparison with connecting faces arranged perpendicularly to the longitudinal axis. For the oblique attitude, it is conceivable to provide an angle of 30-60° between the surface normal and the longitudinal axis. Furthermore, the forces of the holding devices do not then act exclusively along the longitudinal axis, but may also absorb transverse forces. Overall, the quality of the connection may thereby be increased.

It is conceivable that the elongate elements comprise an at least largely cylindrical portion with an outer diameter, wherein the respective connecting face adjoins the respective cylindrical portion, and wherein the holding devices are arranged outside the outer diameter. The connecting faces accordingly extend significantly beyond the outer diameter of the at least largely cylindrical portion. The connecting faces thereby create an annular strip which runs around the outer diameter and is equipped with holding devices. The entire outer diameter of the at least largely cylindrical portion may be used for medium lines. It is conceivable that, in a simple form, the at least largely cylindrical portion is designed as a pipe end, so that the connecting faces form a type of flange which connects the two pipe portions together. It is conceivable that the connecting faces have a central cutout through which the respective medium flows.

It is conceivable that the connecting faces each comprise a cutout. The respective cutout may, in particular, be arranged centrally in the connecting faces. The connecting faces thereby form at least one annular flange-like strip. Congruent cutouts are preferred, so as to allow an unhindered passage of electrical lines or an unhindered flow of a fluid.

The holding devices may comprise magnets, in particular neodymium magnets. The magnets may be arranged such that outwardly-directed north poles on the first connecting face meets outwardly-directed south poles on the second connecting face, and vice versa. The magnets may each have or form a circle segment-like structure and/or alternate with changing orientation, so that as the connecting surfaces are brought closer together, as well as the pure attraction force, a correct orientation of the connecting faces relative to one another is directly achieved. Neodymium magnets are particularly suitable for this purpose since they have a very high magnetic force and can be provided economically on industrial scale.

The holding devices may comprise adhesive elements, rip tape elements, snap connectors, weld connectors, solder connectors, clamp connectors, or vacuum connectors. Adhesive elements may comprise for example a hardenable two-component adhesive. During installation of an above-mentioned assembly or similar, such an adhesive could be applied locally to the connecting faces so that after the connecting faces have been brought into contact, the adhesive points bond together for a secure fixing of the two connecting faces. Rip tape elements are directly connected together by form fit by a sufficiently large superficial contact and can later be separated from one another again relatively easily. Snap connectors may have a preloaded snap mechanism which engages directly when the connecting faces make contact. The above-mentioned solder and weld connectors may be created in the form of selectively providable solder and weld connections. For this, a heat source or a corresponding power source is required which is supplied from the outside. Vacuum connectors could be activated exclusively by application of a vacuum.

The first element and the second element may each comprise at least one pipe portion, wherein at least one of the pipe portions comprises a seal, and wherein the pipe portions are configured such that they are connected together fluid-tightly when the connecting faces are brought into superficial contact. Thus, a continuous fluid line may be created, wherein the mutually facing pipe portions can be connected together fluid-tightly by means of a corresponding seal. It is also conceivable that both the first element and the second element each have a seal, wherein the two seals are adapted to one another. These seals may be configured such that the two pipe portions are automatically centered. For this, one of the two seals may, for example, have a slightly hopper-like or conical form.

The first element and the second element may comprise at least one pair of electrical connectors which are arranged such that they are electrically connected together when the connecting faces are brought into superficial contact. The electrical connectors may each comprise a single pole of an electrical line. It is however also conceivable to provide more complex connectors, which are each multipole and for example can be brought into connection with one another magnetically. In this way, practically arbitrarily complex signal lines may be integrated.

The electrical connectors may be arranged on the respective connecting line. The electrical connectors may accordingly be situated between the individual holding devices. It would be conceivable, in complex system arrangements, to use many electrical connectors which alternate with the holding devices. It is conceivable here that the number of holding devices used is such that a symmetrical force is exerted on the connecting faces.

It is pointed out here that the holding devices themselves may comprise the electrical connectors. This provides a high degree of spatial efficiency and allows a compact form of the connecting face.

The electrical connectors may each be connected to an electrical line which is guided away from the respective connecting face outside the respective elongate element. The electrical line may be attached to and be guided along the outside of the elongate element. The electrical line may comprise several part lines which are connected together into a bundle. The part lines may each be connected to an electrical connector.

Furthermore, the length adjustment component may comprise an elastic member which is integrated into the respective element and allows a shape variability of the respective element. The shape variability may allow an elongation or compression at least in the longitudinal direction. It is also conceivable that in this way, a slight offset between the connecting faces or elongate elements can be compensated.

The invention furthermore concerns a structural and equipment system, comprising an assembly for installation on a structure of a vehicle, and a connecting system according to the above description, wherein a first connector can be arranged on the structure and a second connector on the assembly, wherein the second connector is coupled to a component arranged on the assembly.

The invention furthermore concerns a vehicle, comprising a structure and at least one such structural and equipment system.

The vehicle may be an aircraft. The structure and equipment system may be arranged in an underfloor region of the aircraft.

BRIEF DESCRIPTION OF THE DRAWINGS

Exemplary embodiments are described in more detail below with reference to the appended drawings. The illustrations are schematic and not to scale. The same reference signs refer to the same or similar elements. In the drawings.

DETAILED DESCRIPTION OF THE PREFERRED EMBODIMENTS

Figure 1:
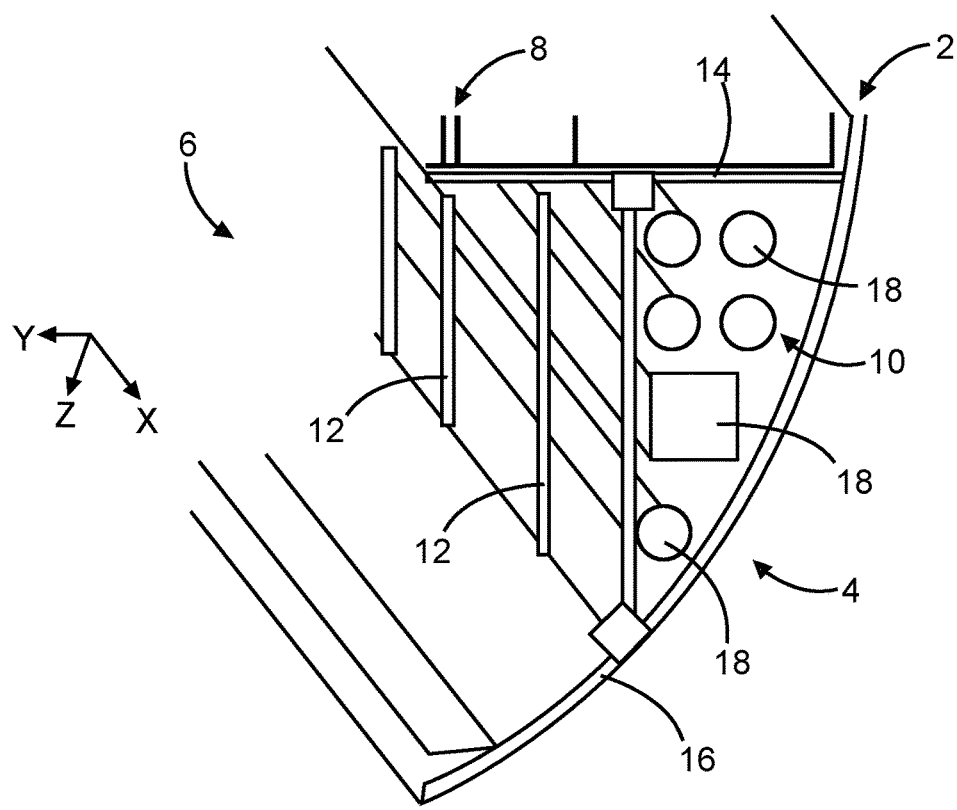
FIG. 1 shows a schematic view of a structural and equipment system in an aircraft.

FIG. 1 shows a structural and equipment system 2 which is installed in a fuselage 4 of an aircraft. As an example, here an underfloor region 6 is shown which is delimited by a floor 8. An assembly 10 is arranged below the floor 8 and may comprise vertical supports 12 which are connected to the floor carriers 14 and a frame 16. Several such assemblies 10 may succeed one another in a longitudinal direction X and comprise several components 18. These may be pipelines, electrical consumers or similar. The structural and equipment system 2 may comprise a connecting system 20 which may be used for simple connection of components 18. The connecting system 20 is explained in more detail below.

Figure 2:
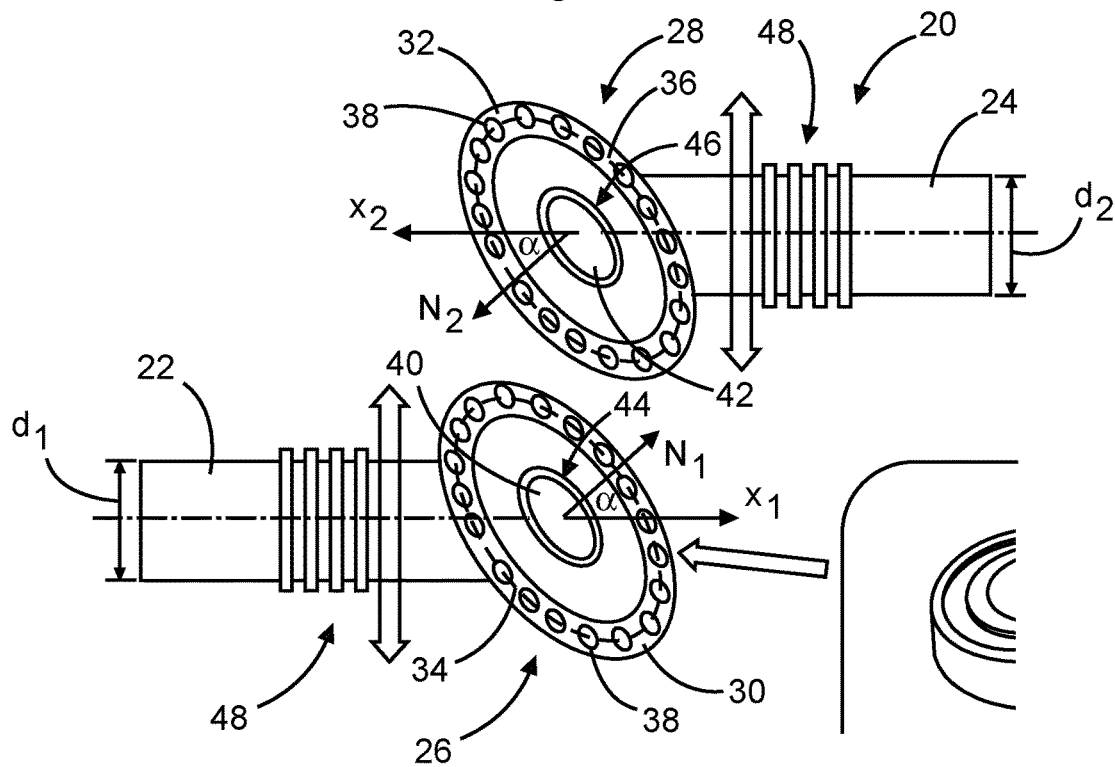
FIG. 2 shows a schematic view of a connecting system.

FIG. 2 shows the connecting system 20, which comprises a first elongate element 22 and a second elongate element 24. The first element 22 has a first end 26. The second element 24 has a second end 28. A first connecting face 30 is arranged on the first end 26, while a second connecting face 32 is arranged on the second end 28. The two elements 22, 24 each have a respective longitudinal extent axis X1, X2. The connecting faces 30, 32 each have a respective surface normal N1, N2, which stands obliquely to the respective longitudinal extent axis X1, X2, for example at an angle $\alpha$ of between 30° and 60° to the respective longitudinal extent axis X1, X2.

The two connecting faces 30, 32 each have a respective connecting line 34, 36 as a theoretical line along which several holding devices 38 are distributed. The connecting lines 34, 36 are arranged outside an outer diameter d1, d2 so that, for example, they form a strip running around the connecting face 30, 32. When the two connecting faces 30, 32 make contact with one another, they are connected by the holding devices 38 so that then the elements 22 and 24 are combined.

A cutout 40, 42 may be arranged in each connecting face 30, 32 as an interface through which a fluid can flow from the first element 22 into the second element 24. To seal the two elements 22, 24, which then function as or comprise pipe portions, seals 44 and 46 may be used. Instead of a pure fluid flow, it is also conceivable to guide electrical lines through the elements 22 and 24. Alternatively however, other variants are conceivable, as explained below.

Figure 3A:
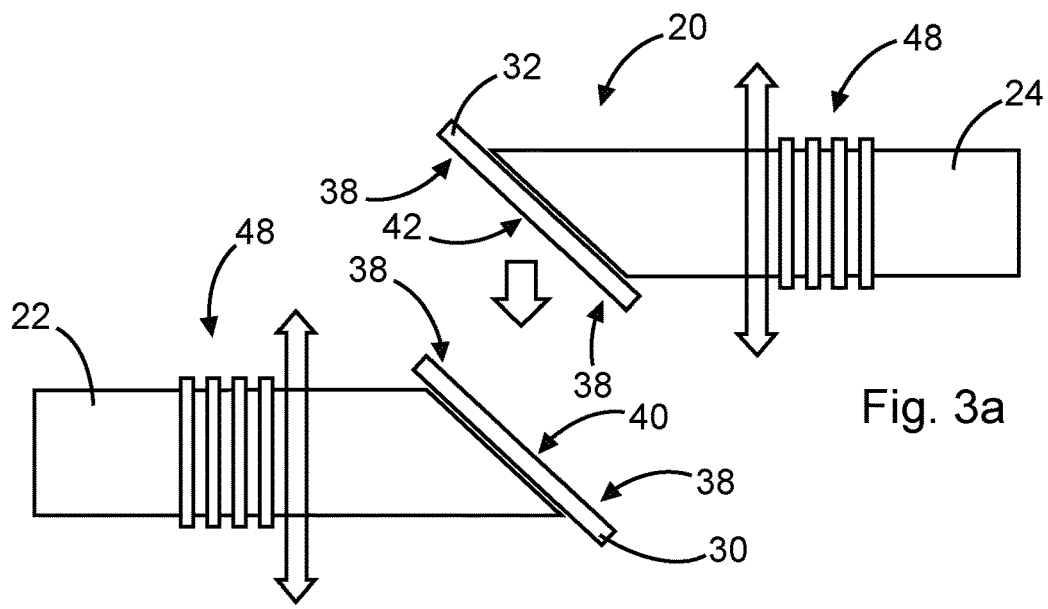
FIGS. 3a and 3b show a connecting process.
Figure 3B:
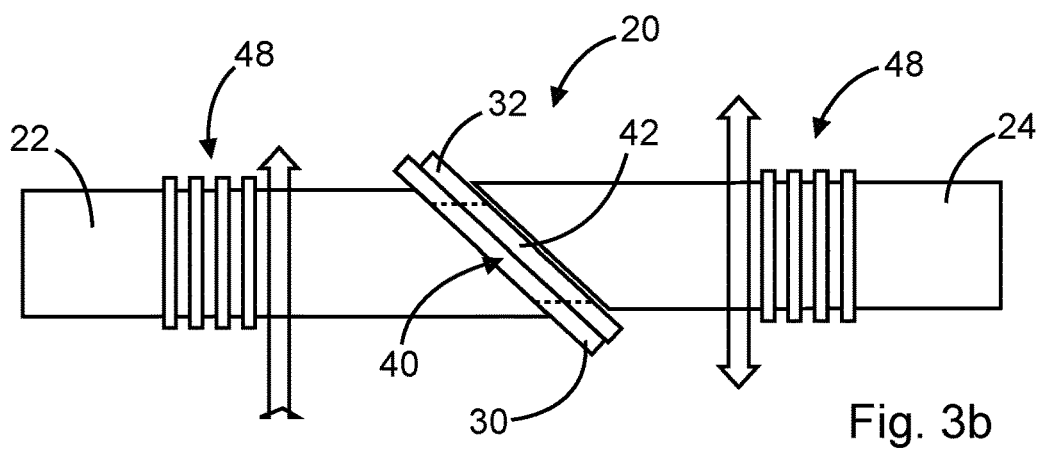

To connect the two elements 22 and 24, the process shown in FIGS. 3a and 3b must be carried out. In FIG. 3a, the two connecting elements 22 and 24 are spaced apart and the connecting faces 30, 32 are brought towards one another. In FIG. 3b, the two connecting faces 30, 32 are connected together so that the two elongate elements 22, 24 form a continuous pipe.

In order to avoid distortions between the elements 22, 24 which may result from the rigid installation of the two elements 22, 24 on a component connected to the structure, length adjustment components 48 are provided. For example, these may be configured as a type of bellows via which the elements 22, 24 may be compressed, extended or otherwise deformed.

Figure 4:
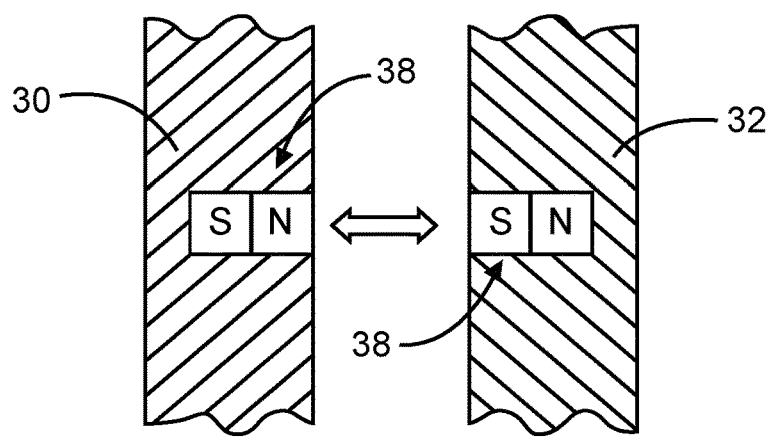
FIG. 4 shows a detail of a holding device.

The holding devices 38 may comprise a magnet so that the two connecting faces 30, 32 exert a mutual attraction. FIG. 4 shows two holding devices 38 in the form of magnets oriented opposite to one another, which may be configured as neodymium magnets. Because of their strong force of attraction, the two connecting faces 30, 32 can be connected together very firmly.

Figure 5A:
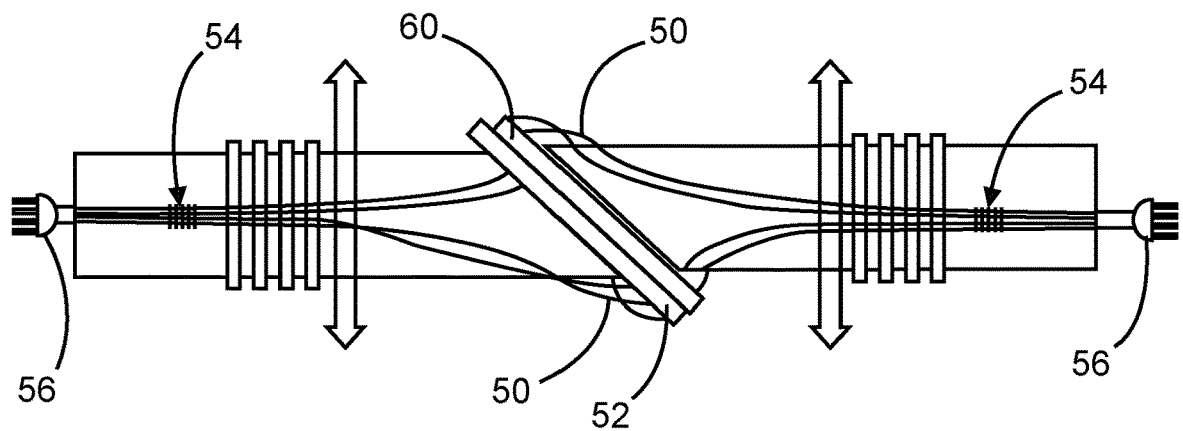
FIGS. 5a and 5b show electrical connectors.
Figure 5B:
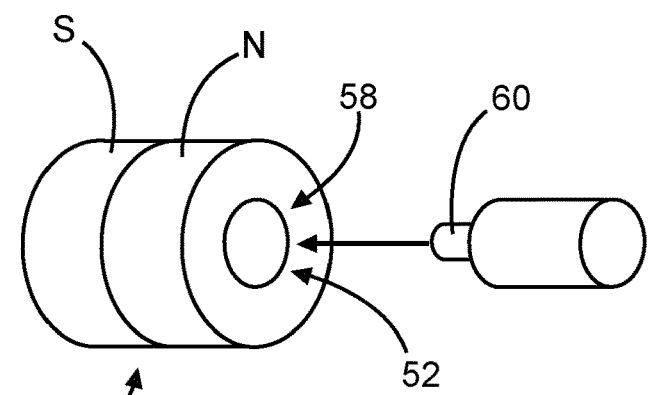

FIG. 5a shows a further modification in which several electrical lines 50 are provided which can be connected together by electrical connectors 52, 60 as interfaces on the connecting faces 30, 32. Several part lines 50 are here coupled into a collective line 54 in the form of a bundle, and are coupled to respective components or lines via terminal connectors 56. The electrical connectors 52, 60 may be arranged separately between the individual holding devices 38. As shown in FIG. 5b however, holding devices 38 may also comprise a bore 58 in which an electrical connector 52 is arranged. A corresponding contact pin 60 on an opposite holding device 38 may snap-fit into such a bore 58 as an electrical connector. It is conceivable that the contact pins 60 are spring-mounted and for example partly conical, in order to allow simple insertion into the bore 58. However, more complex connectors also possible.

Figure 6:
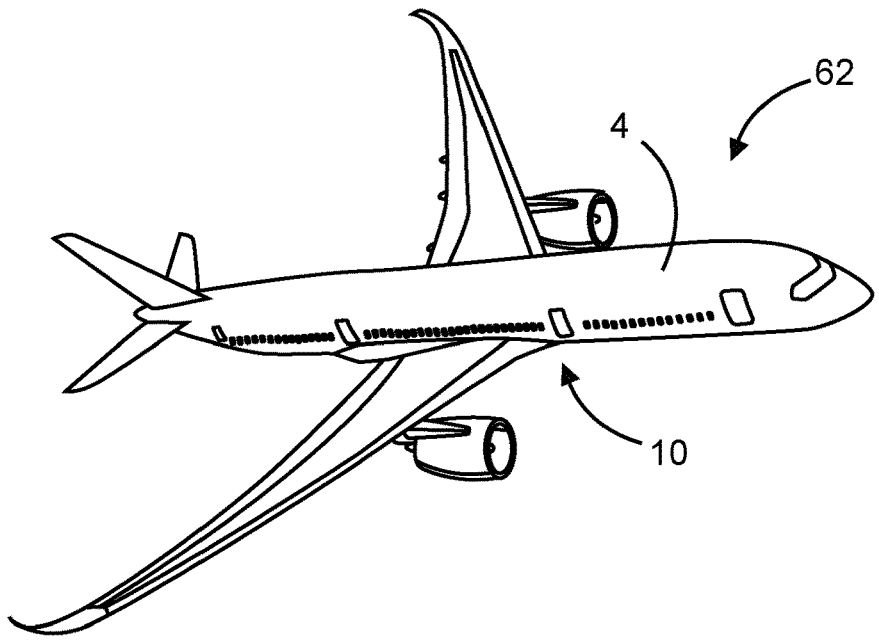
FIG. 6 shows an aircraft.

Finally, FIG. 6 shows an aircraft 62 having a fuselage 4 in which a structural and equipment system 10 is arranged. Several connecting systems 20 may be used there.

In addition, it is pointed out that the terms "comprising" and "having" do not exclude other elements or steps, and the singular form "one" or "a" does not exclude a plurality. It is furthermore pointed out that features or steps which have been described with reference to one of the above exemplary embodiments may also be used in combination with other features or steps from other above-described exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

2 Structural and equipment system
4 Fuselage
6 Underfloor region
8 Floor
10 Assembly
12 Vertical support
14 Floor carrier
16 Frame
18 Component
20 Connecting system
22 First elongate element
24 Second elongate element
26 First end
28 Second end
30 First connecting face
32 Second connecting face
34 First connecting line
36 Second connecting line
38 Holding device
40 Cutout/interface
42 Cutout/interface
44 Seal
46 Seal 48 Length adjustment component
50 Electrical line/part line
52 Electrical connector/interface
54 Collective line
56 Terminal connector
58 Bore
60 Electrical connector/contact pin/interface
62 Aircraft
α Angle
d1 First outer diameter
d2 Second outer diameter
N1 First surface normal
N2 Second surface normal
X1 First longitudinal extent axis
X2 Second longitudinal extent axis

The invention claimed is:

1. A connecting system for connecting components in a vehicle, comprising
a first elongate element with a first connecting face at a first end, and
a second elongate element with a second connecting face at a second end,
wherein the first elongate element and the second elongate element each comprise several holding devices which are distributed along an annular connecting line of the respective connecting face,
wherein the connecting faces and the connecting lines of the first elongate element and second elongate element are congruent,
wherein the connecting faces and holding devices are configured such that the connecting faces can be brought into a flush superficial contact when orientations of the first elongate element and second elongate element coincide, and the then mutually opposite holding devices of the connecting faces brought into superficial contact connect with one another,
wherein at least one of the first elongate element and second elongate element has a respective length adjustment component which adjoins the respective connecting face and is configured to change a position of the respective connecting face in a longitudinal direction of the respective element, and
wherein the connecting faces comprise at least one pair of interfaces which correlate with one another in pairs for transfer of a fluid, electrical or optical signals or an electrical current, which interfaces are configured to be brought into connection when the connecting faces are brought into superficial contact with one another.

2. The connecting system according to claim 1, wherein a respective surface normal of the connecting faces stands obliquely to an extent axis of the respective elongate element.

3. The connecting system according to claim 1,
wherein the first and second elongate elements comprise an at least largely cylindrical portion with an outer diameter,
wherein the respective connecting face adjoins the respective cylindrical portion, and
wherein the holding devices are arranged outside the outer diameter.

4. The connecting system according to claim 1, wherein the first and second connecting faces each comprise a cutout as an interface.

5. The connecting system according to claim 1, wherein the holding devices comprise magnets.

6. The connecting system according to claim 5, wherein the magnets comprise neodymium magnets.

7. The connecting system according to claim 1, wherein the holding devices comprise adhesive elements, rip tape elements, snap connectors, weld connectors, solder connectors, clamp connectors, or vacuum connectors.

8. The connecting system according to claim 1,
wherein the first elongate element and the second elongate element each comprise at least one pipe portion,
wherein at least one of the pipe portion comprises a seal, and
wherein the pipe portions are configured such that they are connected together fluid-tightly when the first and second connecting faces are brought into superficial contact.

9. The connecting system according to claim 8, wherein the electrical connectors are arranged on the respective connecting line.

10. The connecting system according to claim 8, wherein the electrical connectors are each connected to an electrical line which is guided away from the respective connecting face outside the respective elongate element.

11. The connecting system according to claim 1, wherein the first elongate element and the second elongate element comprise at least one pair of electrical connectors as interfaces which are arranged such that they are electrically connected together when the first and second connecting faces are brought into superficial contact.

12. The connecting system according to claim 1,
wherein the length adjustment component comprises an elastic member which is integrated in the respective elongate element and allows a shape variability of the respective elongate element.

13. A structural and equipment system, comprising
an assembly for installation on a structure of a vehicle, and
a connecting system according to claim 1,
wherein the first elongate element can be arranged on the structure and the second elongate element on the assembly,
wherein the second elongate element is coupled to a component arranged on the assembly.

14. A vehicle, comprising a structure and at least one structural and equipment system according to claim 13.

15. The vehicle according to claim 14, wherein the vehicle is an aircraft.

* * * * *